Jan. 11, 1927.

A. C. RIPPY

SNUBBER

Filed Dec. 3, 1925

1,614,392

Inventor
Auctiv C. Rippy

By Eccleston & Eccleston,
Attorneys

Patented Jan. 11, 1927.

1,614,392

UNITED STATES PATENT OFFICE.

AUCTIV C. RIPPY, OF AMARILLO, TEXAS.

SNUBBER.

Application filed December 3, 1925. Serial No. 72,976.

My invention relates to spring devices and especially to a combination of a spring with a fluid cylinder adapted to be attached to an automobile in such a manner that the oscillations of the vehicle will be quickly damped and brought under control after the vehicle has passed over a rut or other rough place on the surface traveled.

An object of the invention resides in providing in such devices a simple and inexpensive means by which the cylinder may be quickly attached to the standard parts of an automobile without the use of tools or skilled labor.

Other objects and advantages of the invention will be apparent from the following description when taken in connection with the accompanying drawing, in which.

Figure 1:
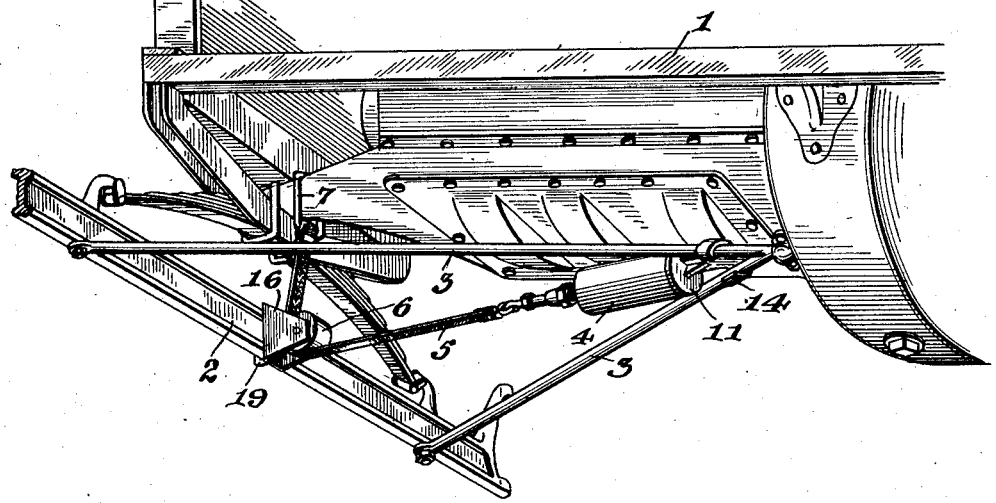
Figure 1 is a perspective view of a portion of an automobile showing the improved snubber in place.
Figure 3:
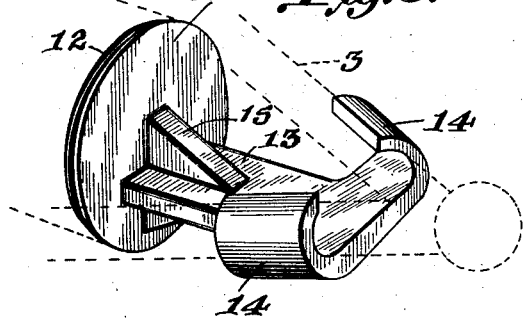
Figure 3 is a perspective view of the attaching means per se.
Figure 2:
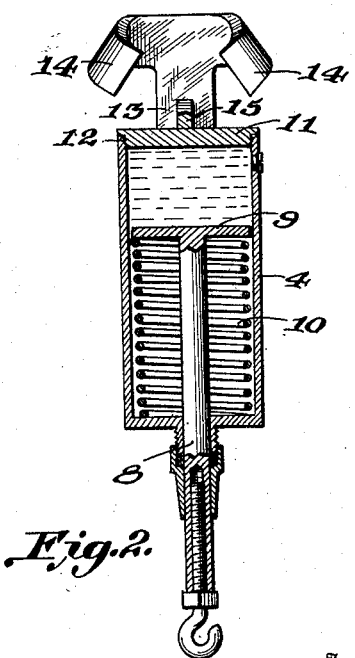
Figure 2 is a longitudinal sectional view through the cylinder and attaching means.
Figure 4:
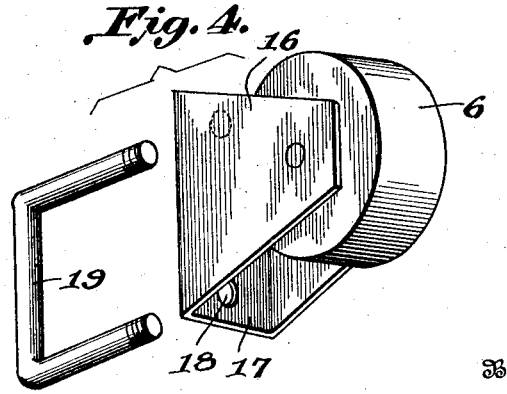
Figure 4 is a perspective view of a guide roller and support.

Referring to the drawings more in detail the numeral 1 indicates a portion of the body and running gear of an automobile provided with the usual front axle 2 and radius rods 3.

According to the present invention the snubber comprises a cylinder 4 and strap 5 which passes over a guide roller 6 rotatably mounted on the axle 2; these elements being more specifically described hereinafter. One end of the strap 5 is secured to the body of the automobile as indicated by the numeral 7 and the other end thereof is secured to the free end of the piston rod 8.

The cylinder 4 is provided with a piston 9 carried by the piston rod 8 and the former is of slightly less diameter than the internal diameter of the cylinder to permit a slow passage of the fluid from one end of the cylinder to the other during the stroke of the piston. A coil spring 10 surrounds the piston rod 8 and has one end in engagement with an end of the cylinder and the other end in engagement with the piston 9 thereby normally holding the piston at the inner limit of its stroke.

The cylinder 4 is permanently closed at its inner end and is provided with a detachable closure 11 at its outer end which is provided with screw threads 12 for cooperation with similar threads on the end of the cylinder. Integrally formed on the exterior of the closure 11 is a means by which the cylinder may be readily attached to the radius rods 3 of the automobile. This anchoring means comprises a hook 13 which is integrally formed on the closure 11 and is provided with rounded and inclined fingers 14 which are adapted to engage over the radius rods adjacent their apex. Obviously, when the cylinder is moved rearwardly over the radius rods and the fingers lowered into engagement therewith and the cylinder given a slight forward movement, these fingers will securely grasp the radius rods due to the inclination of the latter and to the fact that the fingers 14 are similarly inclined. For the purpose of strengthening the connection between the hook member 13 and the closure 11 integral webs 15 are provided on opposite sides of the shank portion.

The strap 5 hereinbefore referred to and which has one end secured to the piston rod 8 passes around the guide roller 6 which is mounted slightly to the rear of the front axle 2 of the automobile. The mounting for this roller comprises a bearing which is bent up from sheet metal so as to provide two wings 16 and a base or back member 17; the latter having formed therein upper and lower apertures 18 for the reception of the ends of a U-bolt. The U-bolt is indicated by the numeral 19 and in mounting the bearing and roller the U-bolt encircles the axle 2 and has its ends rigidly secured to the base member 17 by means of ordinary nuts.

Having described the construction of the snubber per se and the particular manner in which it is mounted on the automobile I will now briefly describe its operation in practice.

When the car is in motion and the spring is riding in its normal position then if the car strikes an unevenness in the road, a rut or the like, the car spring is naturally flexed downwardly allowing the piston 9 to travel to the rear end of the cylinder 4; the piston being forced rearwardly by the pressure of the spring 10. It will be understood that when the car is riding normally the spring 10 of the cylinder is compressed, so that when the car spring flexes downwardly the cylinder spring forces the piston rearwardly. As the piston moves rearwardly the liquid flows to the opposite end of the cylinder. Then on the upward movement of the car spring the plunger has the pressure of the cylinder spring 10 against it, and the pressure of the liquid, both of which act to hold the car against abnormal movement. At the time the car spring passes normal position the oil cushion will increase materially and the snubber will thus work quickly and efficiently to return the car spring to its normal position and reduce oscillation thereof.

The manner of mounting the apparatus seems obvious; the roller 6 having been secured to the front axle 2 and the strap having been anchored to the body of the automobile as indicated by reference numeral 7, the cylinder 4 is merely moved rearwardly above the radius rods 3 until the fingers 14 reach a point where the radius rods are sufficiently close together to permit the fingers to pass thereover; the cylinder is then released and due to the action of the spring 10 the cylinder is drawn forward until the fingers 14 are tightly drawn against the outwardly flared radius rods.

From the foregoing description taken in connection with the accompanying drawing it will be apparent that I have devised an extremely simple and inexpensive type of snubber and one which may be attached to an ordinary automobile without the use of tools or skilled labor of any kind, and one which is efficient and durable in operation.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. In a snubber including a cylinder and piston, a hook carried by the cylinder and comprising a pair of fingers extending inwardly toward the axis of the cylinder adapted to engage over the radius rods of an automobile for anchoring one end of the cylinder.

2. In a snubber including a cylinder and piston, a hook carried by the cylinder and comprising a pair of rounded and inclined fingers adapted to engage over the radius rods of an automobile adjacent their apex.

3. In a snubber including a cylinder and piston, a detachable closure for one end of said cylinder, a hook integrally formed on said closure and comprising a pair of rounded and inclined fingers adapted to engage over the radius rods of an automobile adjacent their apex.

4. In a snubber including a cylinder and piston, a detachable closure for one end of said cylinder, a hook integrally formed on said closure and comprising a pair of rounded and inclined fingers adapted to engage over the radius rods of an automobile adjacent their apex, and reinforcing webs integrally connected to said hook and closure.

AUCTIV C. RIPPY.